United States Patent [19]

Serlin

[11] 4,239,858
[45] * Dec. 16, 1980

[54] COATING COMPOSITIONS COMPRISING POLYMER BLENDS

[75] Inventor: Irving Serlin, Springfield, Mass.

[73] Assignee: Monsanto Company, St. Louis, Mo.

[*] Notice: The portion of the term of this patent subsequent to Aug. 21, 1996, has been disclaimed.

[21] Appl. No.: 38,157

[22] Filed: May 11, 1979

[51] Int. Cl.³ ............................................. C08L 25/06
[52] U.S. Cl. .................................... 525/57; 525/60; 260/33.6 UA
[58] Field of Search .................. 525/57, 60, 220, 227; 260/33.6 UA, 42.51

[56] References Cited

U.S. PATENT DOCUMENTS

| | | | |
|---|---|---|---|
| 3,577,374 | 5/1971 | Isaksen | 525/57 |
| 3,639,640 | 2/1972 | Gager | 428/325 |
| 3,644,594 | 2/1972 | Mont et al. | 525/57 |
| 3,991,253 | 11/1976 | Markhart et al. | 260/33.6 UA |
| 4,165,308 | 8/1979 | Serlin | 525/221 |

FOREIGN PATENT DOCUMENTS 984631  3/1965  United Kingdom ..................... 525/57

*Primary Examiner*—Hosea E. Taylor
*Assistant Examiner*—Amelia B. Yarbrough
*Attorney, Agent, or Firm*—R. Bruce Blance; William J. Farrington; Edward P. Grattan

[57] ABSTRACT

Coating compositions comprising intimate blends of a poly(vinyl acetal) and a low molecular weight polystyrene or poly(α-methylstyrene). The coating compositions may contain up to 500 parts by weight of an inert non-photoconductive pigment per 100 parts by weight of polymer blend. The compositions are useful for the preparation of electrographic recording media which possess improved toner adhesion.

6 Claims, No Drawings

COATING COMPOSITIONS COMPRISING POLYMER BLENDS

This invention relates to a coating composition adapted for use in the preparation of electrographic recording materials.

In general electrographic recording processes involve forming a latent image upon an electrically insulating charge-retentive layer of an electrographic recording material by impressing an electric charge corresponding to an original pattern and treating or developing the latent image by applying to the charge-retentive layer a colored resinous powder or toner which clings to the charged areas but which does not adhere to the unchanged areas. The developed image is then fixed by application of heat and/or pressure to the electrographic recording material to fuse the toner particles to the charge-retentive layer and form a permanent visible image. The electrographic recording material comprises an electroconductive sheet support coated with the electrically insulating charge-retentive layer comprising an electrically insulating polymeric binder and optionally a pigment or filler.

Poly(vinyl acetals) such as poly(vinyl butyrals) have been found to be suitable as the electrically insulating polymeric binder, and are generally coated from solution in an appropriate organic solvent. Attempts have been made to improve the economics of electrographic recording materials containing poly(vinyl acetal) as the electrically insulating polymeric binder by extending the poly(vinyl acetal) with another polymer. However, such attempts have been defeated by undesirable rheology of the solution of the polymer blend, by impairment in charge-retentive properties of the electrographic recording material, by decrease in print density of the developed image or by decrease in toner retention when the developed recording material is subjected to an adhesion test.

SUMMARY OF THE INVENTION

According to the present invention, there is provided a coating composition adapted for use in the preparation of electrographic recording material comprising an intimate blend of from about 40 to about 90 parts by weight of a poly(vinyl acetal) and from about 10 to about 60 parts by weight of a low molecular weight polystyrene or poly(α-methylstyrene). The recording material prepared from the coating composition exhibits improved resistance to toner smear and improved toner retention when the developed recording material is subjected to an adhesion test.

DESCRIPTION OF THE PREFERRED EMBODIMENTS

The poly(vinyl acetals) useful in the present invention are actually interpolymers of a $C_5$ to $C_9$ vinyl acetal, a $C_4$ to $C_{10}$ vinyl carboxylate and vinyl alcohol of weight average molecular weight in the range of about 10,000 to about 500,000 comprising less than about 30 weight percent interpolymerized vinyl carboxylate units and from about 5 to 21 weight percent of interpolymerized vinyl alcohol units. The preferred vinyl carboxylate is vinyl acetate. Particularly preferred poly(vinyl acetals) comprise from about 9 to about 18 weight percent of vinyl alcohol units and have a molecular weight in the range of about 25,000 to about 250,000. Among the preferred poly(vinyl acetals) are those wherein the cyclic vinyl acetal units are derived from saturated and unsaturated aliphatic aldehydes such as formaldehyde, acetaldehyde, propionaldehyde, butyraldehyde, isobutyraldehyde, valeraldehyde, acrolein and crotonaldehyde. Poly(vinyl formal), poly(vinyl acetal), poly(vinyl propional) and poly(vinyl butyral) are especially preferred.

The poly(vinyl acetal) is blended with a polystyrene or poly(α-methylstyrene) of molecular weight in the range of about 500 to about 1500 as an extender for the poly(vinyl acetal).

The blend ratio of poly(vinyl butyral) and poly(α-methylstyrene) is selected in the range of about 40 to about 90 parts by weight of poly(vinyl acetal) and from about 10 to about 60 parts of polystyrene or poly(α-methylstyrene). Preferably, the blend ratio is selected in the range of about 50 to about 80 parts by weight of polyvinyl acetal) to about 20 to about 50 parts of polystyrene or poly(α-methylstyrene) in order to obtain a significant degree of extension without sacrifice in image density retention of the developed electrographic recording material prepared from the blend.

When the poly(vinyl acetal) has a glass transition temperature above about 30° C., coated electrographic recording materials prepared from such poly(vinyl acetals) may manifest a tendency to curl when they are subjected to variable conditions of humidity. This curling tendency can be conveniently minimized by plasticizing the poly(vinyl acetal) with an extremely low molecular weight, liquid or fluid, polystyrene or poly-(α-methylstyrene) or molecular weight in the range of about 300 to about 500. Up to about 70 parts by weight of such low molecular weight polystyrene or poly(α-methylstyrene) per 100 parts by weight of poly(vinyl acetal) may be added for this purpose without sacrificing electrographic properties such as toner retention of the electrographic recording material.

The coating composition comprising the polymer blend is applied to a support in the form of a continuous film from organic solvent solution or dispersion by means generally known in the art, such as by spray, brush, roller, wire-rod, doctor blade, air-brush, and wiping techniques. Appropriate organic solvents for the blend include solvents such as the lower alcohols, ketones and esters and mixtures of such solvents with the lower aliphatic, alicyclic and aromatic hydrocarbons. As is generally known the use of high boiling solvents may prevent adequate drying in the drying oven.

An inert non-photoconductive pigment may be added to the solution. A fine dispersion of the pigment can be obtained by conventional high shear mixing. Afterwards the viscosity can be adjusted e.g. by the addition of solvents. This depends, of course, on the nature of the coating systems used. Suitable non-photoconductive pigments are organic as well as inorganic substances such as silica, calcined clay, zinc oxide, zinc sulfide, titanium dioxide, talcum, calcium carbonate, diatomaceous earth, barium sulfate and lithopone. The grain size of the pigments should not exceed about 20 microns and preferably should be less than about 10 microns. Preference is given to pigments having a particle size of at most about 1 micron.

The use of coating compositions containing non-photoconductive pigments in the preparation of electrographic recording material has many advantages. By the addition of pigments a more economical recording material can be obtained, a mat aspect can be given to the electrographic recording material and "tooth" or ability to be marked or written upon by pen or other marking means is improved. The range of the amounts of pigments is rather large. Depending on the poly(vinyl acetal), the size of the pigment particles, and the intended use of the electrographic recording material, 0.1 to 500 parts of pigment per 100 parts of insulating polymeric binder can be used. In order to obtain the advantages of the pigment, preferably from about 200 to about 400 parts of pigment per 100 parts by weight of polymer blend is used.

The amount or weight of coating composition used to prepare the recording material should be sufficient to provide a uniform coating substantially free of defects which might impair the quality of the image reproduced on the insulating layer. The amount can be in the range of about 2 to about 20 g dry weight per sq. m. of recording material, preferably from about 4 to about 10 g. and even more preferably from about 5 to about 8 g/sq.m. However, smaller amounts may suffice if a sufficient electrostatic charge can be applied to the recording material without risk of breakdown. Thicker layers are less favorable because processing difficulties may arise during charging and development of the electrographic recording material.

In general the coating composition is applied to a paper support in the preparation of the electrographic recording material, although other supports such as metal foils or sheets, textile materials, and plastic films such as films of cellulose triacetate or of polyesters e.g. of polyethylene terephthalate can also be used. In comparison to the insulating layer, the support must have a much higher electric conductance as will be described more clearly hereinafter.

The electroconductivity of normal paper is rather low, especially when it has been coated with a covering layer e.g. of polyolefins such as polyethylene or polypropylene. Therefore, the electroconductivity of the paper should be enhanced to obtain an appropriate electrographic recording material. This can be accomplished e.g. by the addition of salts such as potassium nitrate and/or conductive polymers to the wood pulp during the paper making. A favorable electroconductivity of the paper can also be obtained by impregnating the paper already formed with solutions of salts and/or conductive polymers. Good results are obtained also with paper carrying on at least one side a conductive layer serving as an intermediate layer between the support and the insulating layer. This conductive layer may be composed of e.g. conductive polymers. Surface resistivity values in the range of about $1 \times 10^7$ to $1 \times 10^{10}$ ohm/sq. for the support allow a normal charging of the insulating surface. Indeed, it should be taken into account, that the surface resistance values of the insulating layer, when measured in the same way, are normally much higher and will show values of $1 \times 10^{11}$ to $1 \times 10^{14}$ ohm/sq. or even more.

What has been said above concerning the improvement of the conductivity of paper by the application thereto of conductive polymers also applies to other supports. By the application of conductive polymers to at least one side of these supports a satisfactory electroconductivity can also be obtained. Of course, it may sometimes by necessary, for example, when highly hydrophobic films are used as supports e.g. films of polyethylene terephthalate, to provide these film supports first with a known subbing layer or combination of layers to secure a sufficient adhesion of the layers coated thereon.

The electrographic recording material prepared from the coating compositions can be used in an electrostatic printing apparatus wherein an electrostatic charge pattern is built up on the insulating layer by conventional means such as by moving the material in close contact with electroconductive styli or by transferring an electrostatic charge pattern from a photoconductive drum. The electrostatic latent charge pattern formed on the insulating layer can be developed according to techniques known in the art, e.g. by means of a two-component developer composed of a toner and a carrier material or by liquid electrophoretic development. The developed pattern is then made permanent or fixed by application of heat or pressure to fuse the toner to the insulating layer.

The invention is further described and illustrated in the following examples which should not be construed as limiting its scope. All parts and percentages are by weight unless otherwise indicated.

EXAMPLE 1

A uniform blend of a calcined clay sold by Englehard Minerals and Chemicals Division under the tradename Ansilex, a poly(vinyl butyral) characterized by a vinyl acetate content of 1.5 percent, a hydroxyl content of 12 percent and a weight average molecular weight of 50,000, a poly($\alpha$-methylstyrene) of molecular weight 790 and a toluene/ethanol solvent is prepared by mixing the ingredients with a high speed blender. The weight ratio of calcined clay, poly(vinyl butyral), poly($\alpha$-methylstyrene), toluene and ethanol is 40:2.7:1.3:53:3. The blend is further mixed with an additional quantity of poly(vinyl butyral), poly($\alpha$-methylstyrene) and a plasticizing liquid polystyrene of molecular weight about 300, sold by Hercules Powder Co. under the tradename of Piccolastic A-5, and additional solvent blend to obtain a uniform dispersion containing 12.5 parts calcined clay, 6.3 parts poly(vinyl butyral), 3.1 parts poly($\alpha$-methylstyrene), 3.1 parts liquid polystyrene, 68 parts toluene and 7 parts ethanol. The pigment to binder ratio is 1:1 and the poly(vinyl butyral) to poly($\alpha$-methylstyrene) ratio is 2:1. The viscosity of the dispersion at 25° C. is 110 cps.

The dispersion is applied with a Meyer number 12 wire wound rod to the wire side of an electrically conductive paper stock sold by the James River Company under the trade designation J Stock to provide a dry coating weight of about 8.0 g. per sq. meter of recording material. The coated paper is stored for 16 hours at 22° C. and 50 percent relative humidity and is printed from a standard master at 50 percent relative humidity in a Minolta 101 Electrographic Copier. The printed paper is subjected to a smear test by rubbing it with a finger and is rated 3 on a scale of 1 to 10 where 1 indicates that substantially no smear, finger printing or smudging occurred, 5 indicates that some smear but litter finger printing occurred and 10 indicates that substantial smear and finger printing occurred.

The print density is determined by the Welch Scientific Company's Densichron Instrument using the black filter and standardized against the Reflection Standard No. 2 at a density of 0.505. The print density is 1.23. The paper is subjected to an adhesion test at 25° C. and 50 percent relative humidity and the print density is again measured. In the adhesion test, a strip of pressure sensitive adhesive tape sold under the tradename Scotch Magic Transparent Tape No. 810 by the 3M Company, is applied to the developed image by means of a 5 pound (2.27 kg), 4 inch diameter (10.16 cm) rubber roller and is then peeled at a 90° angle at a rate of about 10 inches (25.4 cm) per minute. The percent retention of density is calculated from the values before application of the tape and after its removal. The density retention in the tape test is 100 percent.

In contrast, a recording medium (Example 2) prepared with the poly(vinyl butyral) without the α-methylstyrene polymer has a smear resistance rating of 3, a print density of 1.20 and a density retention in the tape test of 93 percent. On the other hand, a smooth dispersion containing as the binder poly(α-methylstyrene) plasticized with Piccolastic A-5 cannot be made, and when the lumpy dispersion is coated onto the electroconductive support, it gives an uneven grainy coating unsatisfactory for electrographic purposes.

EXAMPLES 3 AND 4

Dispersions are prepared by the procedure of Example 1 with poly(α-methylstyrenes) of molecular weight 690 and 960, respectively, in place of the poly(α-methylstyrene) of molecular weight 790. The dispersions are used to prepare electrographic recording materials in the manner described in Example 1. The recording materials are evaluated by printing them in a Minolta 101 Electrographic Copier. Data for image density retention are presented in Table 1 and show that unlike Example 2 which contains no poly(α-methylstyrene), there is no loss of image density when the prints are subjected to the tape adhesion test.

EXAMPLES 5, 6 AND 7

Dispersions are prepared by the procedure of Example 1 with poly(α-methylstyrenes) of molecular weight 690, 790 and 960, respectively, the weight ratio of poly(vinyl butyral) to poly(α-methylstyrene) being 1:1 and the dispersion compositions containing 12.5 parts calcined clay, 4.7 parts poly(vinyl butyral), 4.7 parts poly(α-methylstyrene), 3.1 parts liquid polystyrene, 68 parts toluene and 7 parts ethanol. The dispersions are used to prepare electrographic recording materials in the manner described in Example 1. The recording materials are evaluated by printing them in a Minolta 101 Electrographic Copier. Unlike Example 2 which contains no poly(α-methylstyrene) there is no loss of image density when the prints are subjected to the tape adhesion test (Table 1).

EXAMPLES 8 AND 9

Dispersions are prepared by the procedure of Example 1 with polybutenes of molecular weight 460 and 920, respectively, substituted for the poly(α-methylstyrene) of Example 5. The dispersions contain 12.5 parts calcined clay, 4.7 parts poly(vinyl butyral), 4.7 parts polybutene, 3.1 parts liquid polystyrene, 68 parts toluene and 7 parts ethanol. The dispersions are used to prepare electrographic recording materials in the manner described in Example 1. The recording materials are evaluated by printing them in a Minolta 101 Electrographic Copier. The prints which are obtained are decreased significantly in density when they are subjected to the tape adhesion test (Table 1).

TABLE 1
POLY(VINYL BUTYRAL) ELECTROGRAPHIC RECORDING MATERIALS

| Example | Polyblend Component | Molecular Weight of Component | Blend Ratio (1) | Coating Weight g/m | Image Density Retention % |
|---|---|---|---|---|---|
| 1 | P(α-MeS) | 790 | 2:1 | 8.9 | 100 |
| 2 | — | — | — | 8.8 | 93 |
| 3 | P(α-MeS) | 690 | 2:1 | 8.8 | 100 |
| 4 | P(α-MeS) | 960 | 2:1 | 8.8 | 100 |
| 5 | P(α-MeS) | 690 | 1:1 | 8.9 | 100 |
| 6 | P(α-MeS) | 790 | 1:1 | 9.4 | 100 |
| 7 | P(α-MeS) | 960 | 1:1 | 9.9 | 100 |
| 8 | Polybutylene | 460 | 1:1 | 9.3 | 66 |
| 9 | Polybutylene | 920 | 1:1 | 8.8 | 67 |

What is claimed is:

1. A coating composition comprising an intimate polymer blend of from about 40 to about 90 parts by weight of a polyvinyl acetal and from about 10 to about 60 parts by weight of a homopolymer of styrene or α-methylstyrene of molecular weight in the range of about 500 to about 1500 wherein the poly(vinyl acetal) is an interpolymer of a $C_5$ to $C_9$ vinyl acetal, a $C_4$ to $C_{10}$ vinyl carboxylate and vinyl alcohol, of weight average molecular weight in the range of about 20,000 to 500,000, comprising less than about 30 weight percent vinyl carboxylate units and from about 5 to about 21 weight percent of vinyl alcohol units.

2. The coating composition of claim 1 wherein the vinyl carboxylate is vinyl acetate and wherein the poly(vinyl acetal) is of weight average molecular weight in the range of from about 25,000 to about 250,000 and comprises from about 9 to about 18 weight percent vinyl alcohol units.

3. The coating composition of claim 2 wherein the vinyl acetal is selected from the group consisting of vinyl formal, vinyl acetal, vinyl propional and vinyl butyral.

4. The coating composition of claim 3 additionally comprising up to 70 parts by weight of a plasticizing polystyrene or (polyα-methylstyrene) of molecular weight in the range of about 300 to about 500 per 100 parts by weight of poly(vinyl acetal).

5. The coating composition of claim 4 additionally comprising up to about 500 parts by weight of a finely divided pigment per 100 parts by weight of polymer blend.

6. The coating composition of claim 5 wherein the finely divided pigment is selected from the group consisting of silica, calcined clay, zinc oxide, zinc sulfide, titanium dioxide, talcum, barium sulfate, calcium carbonate, lithopone, and diatomaceous earth.

* * * * *